United States Patent
Albu et al.

(10) Patent No.: US 7,438,352 B2
(45) Date of Patent: Oct. 21, 2008

(54) SEALING ARRANGEMENT

(75) Inventors: Daniel Albu, Herrenberg (DE); Bernard Zobec, Altdorf (DE)

(73) Assignee: Daimler AG, Stuttgart (DE)

( * ) Notice: Subject to any disclaimer, the term of this patent is extended or adjusted under 35 U.S.C. 154(b) by 263 days.

(21) Appl. No.: 11/494,998

(22) Filed: Jul. 27, 2006

(65) Prior Publication Data

US 2007/0029130 A1 Feb. 8, 2007

(30) Foreign Application Priority Data

Jul. 27, 2005 (DE) .................. 10 2005 035 703

(51) Int. Cl.
*B60K 37/00* (2006.01)
*B60S 1/54* (2006.01)
*H05B 3/84* (2006.01)
*A47L 1/16* (2006.01)

(52) U.S. Cl. .............. 296/208; 15/250.05; 296/70; 454/127

(58) Field of Classification Search ............ 15/250.001, 15/250.05; 219/203; 237/12.3 A, 12.3 R, 237/28; 296/70, 190.1, 200, 201, 208; 454/127, 454/162
See application file for complete search history.

(56) References Cited

U.S. PATENT DOCUMENTS

| | | | | | |
|---|---|---|---|---|---|
| 2,497,261 | A | * | 2/1950 | Hicks | 296/96.21 |
| 4,105,246 | A | * | 8/1978 | Trumbull | 296/97.7 |
| 4,549,471 | A | * | 10/1985 | Kochy et al. | 454/127 |
| 5,386,098 | A | * | 1/1995 | Knudsen | 219/203 |
| 5,709,601 | A | * | 1/1998 | Heck | 454/121 |
| 5,987,216 | A | * | 11/1999 | Krug | 392/379 |
| 5,997,078 | A | * | 12/1999 | Beck et al. | 296/208 |
| 6,464,280 | B1 | * | 10/2002 | Shibata et al. | 296/70 |
| 6,601,902 | B1 | * | 8/2003 | Rahmstorf et al. | 296/70 |
| 6,722,731 | B2 | * | 4/2004 | Cornils et al. | 296/201 |
| 6,866,321 | B2 | * | 3/2005 | Yang | 296/72 |
| 2006/0040605 | A1 | * | 2/2006 | Lee | 454/121 |

FOREIGN PATENT DOCUMENTS

| | | |
|---|---|---|
| DE | 39 09 389 | 9/1990 |
| DE | 19902232 A1 * | 7/2000 |
| DE | 20 2004 006 337 | 7/2004 |
| FR | 2623776 A1 * | 6/1989 |
| JP | 63242712 A * | 10/1988 |

* cited by examiner

*Primary Examiner*—D. Glenn Dayoan
*Assistant Examiner*—Paul A Chenevert
(74) *Attorney, Agent, or Firm*—Kenyon & Kenyon LLP

(57) ABSTRACT

In a sealing arrangement, e.g., for sound-insulating sealing of a gap between a windscreen of a vehicle and instrument panel, a first sealing element is arranged between the instrument panel and the windscreen, below the first sealing element a second sealing element is arranged between the windscreen and a base component, the sealing arrangement including openings through which air may flow into a passenger compartment of the vehicle. As a result, both a defrosting of the wiper system and also sound insulation may be provided.

20 Claims, 1 Drawing Sheet

SEALING ARRANGEMENT

CROSS-REFERENCE TO RELATED APPLICATIONS

The present application claims priority to Application No. 10 2005 035 703.2, filed in the Federal Republic of Germany on Jul. 27, 2005, which is expressly incorporated herein in its entirety by reference thereto.

FIELD OF THE INVENTION

The present invention relates to a sealing arrangement, e.g., for the sound-insulating sealing of a gap between a windscreen of a vehicle and an instrument panel, with a first sealing element being arranged between the instrument panel and the windscreen.

BACKGROUND INFORMATION

German Published Utility Model No. 20 2004 006 337 describes an air-guiding element for an instrument panel of a motor vehicle, having a tubular sealing lip which is of single-piece arrangement. In the fitted state of the air-guiding element, the single-piece, hollow sealing lip bears in a sealing manner against the lower side of the instrument panel, against a front wall arranged between the engine and passenger compartment or against the windscreen.

German Published Patent Application No. 39 09 389 describes a sound-insulating arrangement which includes a foam-material layer and a heavy layer and is arranged between an instrument panel and an upper part of the front wall of a passenger vehicle. The front edge region of the sound-insulating arrangement has a convex curvature which bears in a resilient and therefore soundproof manner against an elastomeric seal of the instrument panel.

If the gap between the windscreen and instrument panel is completely closed by a continuous sealing lip between the instrument panel and the windscreen, no defrosting of the wiper system, in particular, of the wiper blades, by hot air can occur. In arrangements of this type, an expensive electric defrosting system may be necessary.

SUMMARY

Example embodiments of the present invention may provide a sealing arrangement with which both a sound insulation in relation to engine noises and also a hot-air defrosting of at least parts of the wiper system are possible.

According to an example embodiment of the present invention, a sealing arrangement is provided, in which below the first sealing element a second sealing element is arranged between the windscreen and a base component, the sealing arrangement having openings through which air can flow into the passenger compartment. By providing two sealing elements, in each instance one between the windscreen and the instrument panel and one between a base component and the windscreen, an improved acoustic behavior may be achieved. In addition, the region between the two sealing elements may be subjected to a stream of hot air, so that a defrosting of the wiper blades may occur. The air may escape again from the windscreen region through the openings. The second sealing element may be arranged above a fastening device of the windscreen, e.g., an adhesive-bonding point.

The second sealing element may be interrupted in some sections. As a result, a better defrosting action may be achieved.

Provision may be made for one or more channels which are angled once or more than once to be formed by the first and second sealing elements. As a result, a sound-absorbing effect may be achieved, so that engine noises may be greatly damped and no longer penetrate to such a severe extent into the passenger cell.

One or more labyrinthine and/or meandering channels may be provided by the first and second sealing elements. This measure may prevent sound from being able to propagate linearly. Due to the angled portions, the sound waves repeatedly strike against surfaces which bound the channels and which may be formed of a material which absorbs the sound wave at least to the greatest possible extent.

The repeated diverting of the air, and as a result, of the sound waves may provide a sound absorption to occur although there is an air-exchange connection between the space bounded by base parts, instrument panel and windscreen and the passenger compartment because of the openings of the sealing arrangement.

A labyrinthine refinement may be obtained, e.g., in that the first and second sealing elements each have sealing-element sections and sealing-element sections of the first and second sealing elements overlap in some sections. The first and second sealing elements may be formed, e.g., of foam-material strips, with the foam-material strips of a sealing element being spaced apart from one another. As a result, the sealing arrangement may be realized in a particularly simple manner.

A particularly good sound-insulating effect may be achieved if the overlapping regions have a length, e.g., greater than 50 mm, e.g., greater than 75 mm, e.g., approximately 100 mm. This may result in air and also sound waves being channeled over a predetermined region and being forced between the first and second sealing elements.

The defrosting of the wiper blades may be achieved, e.g., in that the windscreen is subjected to a stream of hot air which emerges from air outlet openings of a defrosting channel of the instrument panel. In order to arrange the defrosting to be particularly effective, it may be provided that the second sealing element has an interruption in the region of one or more wiper blades. As a result, it may be provided that the actual region of the windscreen which may be necessary for defrosting the wiper blades is sufficiently subjected to a stream of hot air.

Provision may be made for lateral openings which are arranged, e.g., next to the instrument panel and/or the defrosting channel to be defined by the first and second sealing elements. By the openings, it may be provided that air, to the stream of which the windscreen is subjected, may also escape again. By the first and second sealing elements, the air is guided in the direction of the lateral openings where it may flow out next to the instrument panel and may pass into the passenger compartment. The air may be deflected in these lateral regions, so that a sound-insulating effect may be produced.

A particularly good sound-insulating effect may be achieved if the distance between the first and second sealing elements at least at one point in the region of a lateral opening is, e.g., approximately 70 mm.

The deflection of the air and of the sound waves may be achieved in a particularly simple manner in the region of the lateral openings by in that the second sealing element is of substantially L-shaped arrangement in its side regions. The L-shape may include two sealing-element sections.

The first sealing element may include, in the center of the vehicle, an interruption which forms an opening of the sealing arrangement. As a result, hot-air defrosting is possible, since the hot air may escape at this point. In addition, a channeling of the air to this opening may occur, with the air being guided between the first and second sealing elements, e.g., in an overlapping region, as a result of which a sound-absorbing effect is produced. Due to this measure, an expensive electric defrosting system may not be necessary.

The interruption of the first sealing element in the center of the vehicle may have a length of, e.g., approximately 130 mm.

The sound-absorbing effect of the sealing arrangement may be increased if the first and/or second sealing element(s) is/are formed from a foam material. Sound waves may be particularly readily damped and absorbed by foam material.

A particularly good sound-insulating effect may be achieved if the foam material is a polyurethane cut foam.

The foam material may be acrylate-impregnated. As a result, the foam material may be insensitive to moisture. It stores no moisture or at least only a little moisture.

The foam material may be pressed between the windscreen and the instrument panel, and/or the base component. By this measure, the foam material may be acoustically more soundproof. Sound may be absorbed even better.

If the first sealing element is fastened to the instrument panel, e.g., is adhesively bonded thereto, the installation of the sealing arrangement may be facilitated. As a result, the first sealing element may be fitted together with the instrument panel. During the installation of the instrument panel, the first sealing element comes automatically into contact with the windscreen. In addition, it is pressed in the process between the instrument panel and the windscreen.

According to an example embodiment of the present invention, a seal arrangement includes: a first seal component adapted to be arranged between an instrument panel of a vehicle and a windscreen of the vehicle; and a second seal component arranged below the first seal component and arranged between the windscreen and a base component, the seal arrangement including openings through which air is flowable into a passenger compartment of the vehicle.

The seal arrangement may be adapted for a sound-insulative seal of a gap between the windscreen and the instrument panel.

The second seal component may be interrupted in some sections.

At least one channel angled at least once may be formed by the first seal component and the second seal component.

At least one of at least one of (a) a labyrinthine and (b) a meandering channel may be formed by the first seal component and the second seal component.

Each of the first seal component and the second seal component may include a seal-component section that overlap in some sections.

The overlapping regions may have a length of one of (a) greater than 50 mm, (b) greater than 75 mm and (c) approximately 100 mm.

The second seal component may include an interruption in a region of at least one wiper blade.

The first seal component and the second seal component may provide lateral openings arranged next to at least one of (a) the instrument panel and (b) a defrosting channel.

A distance between the first seal component and the second seal component at least at one location in a region of the lateral opening may be approximately 70 mm.

The second seal component may be substantially L-shaped in side regions.

The first seal component may include, in a center of the vehicle, an interruption forming an opening of the seal arrangement.

The interruption may have a length of approximately 130 mm.

At least one of (a) the first seal component and (b) the second seal component may be formed from a foam material.

The foam material may include a polyurethane cut foam.

The foam material may be acrylate-impregnated.

The foam material may be pressed between the windscreen and at least one of (a) the instrument panel and (b) the base component.

The first seal component may be fastened to the instrument panel.

The first seal component may be adhesively bonded to the instrument panel.

According to an example embodiment of the present invention, a vehicle includes a seal arrangement as described herein.

Further features and aspects of example embodiments of the present invention are described in more detail below with reference to the appended Figures.

DETAILED DESCRIPTION

Figure 1:
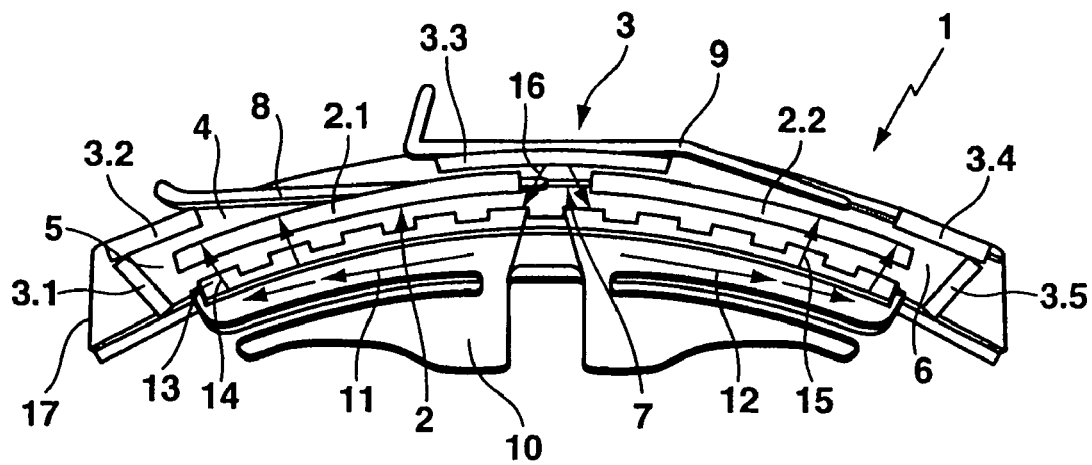
FIG. 1 is a schematic plan view of a sealing arrangement.

FIG. 1 is a schematic plan view of a sealing arrangement 1. The sealing arrangement 1 includes a first sealing element 2, which includes the sealing-element sections 2.1, 2.2, and a second sealing element 3, which includes the sealing-element sections 3.1, 3.2, 3.3, 3.4, 3.5. Labyrinthine channels 4 are formed by the sealing elements 2, 3. The second sealing element 3 is of L-shaped arrangement in the side regions, the L-shape being formed by the sealing-element sections 3.1, 3.2 and 3.4, 3.5. The sealing-element sections 2.1 and 3.1 and also 2.2 and 3.5 each form a lateral opening 5, 6, with the size of the opening, e.g., the distance between the sealing-element section 2.1 and the sealing-element section 3.1 or between the sealing-element section 2.2 and the sealing-element section 3.5 being, e.g., approximately 70 mm. However, the sealing-element sections 3.1 and 3.5 are not absolutely necessary, but rather are used optionally, e.g., depending on the situation.

A sound-absorbing effect is achieved, since the sealing-element sections 2.1, 2.2, 3.1-3.5 of the first and second sealing elements 2, 3 overlap in some sections. In the exemplary embodiment illustrated, the sealing-element sections 2.1 and 3.2, 2.1 and 3.3, 3.3 and 2.2, 2.2 and 3.4 overlap in each case by, e.g., approximately 100 mm. The first sealing element 2 has, in the center of the vehicle, an interruption 7 which constitutes an opening of the sealing arrangement 1. In the exemplary embodiment illustrated, the interruption and therefore the distance between the sealing-element sections 2.1, 2.2 is, e.g., 130 mm.

The airflow for defrosting wiper blades of windscreen wipers 8, 9 is illustrated by arrows. In a defrosting channel 10, of which a plan view is illustrated in FIG. 1, and which is arranged under an instrument panel 25, air first of all flows laterally in the direction of the arrows 11, 12 and then through air outlet openings 13 in the arrow direction 14, 15 toward the windscreen. In this exemplary embodiment, the air flows under the first sealing element 2 toward the windscreen 20. In the region between the first and second sealing elements 2, 3 and in the region of interruptions between the sealing-element sections 3.2, 3.3, 3.4, hot air, e.g., passes onto the windscreen, so that a defrosting of the wiper blades of the windscreen wipers 8, 9 may occur. The air is deflected by the windscreen and the sealing-element sections 3.1 to 3.5 of the second sealing element 3, which is indicated by the arrows 16. The deflected air may flow, for example, through the interruption 7 and the lateral openings 5, 6 into the passenger compartment. On the way there, the air flows along the sealing elements 2, 3, as a result of which a sound absorption occurs. The sealing-element sections 3.1 to 3.5 are fastened on a base component 17 of the vehicle.

Figure 2:
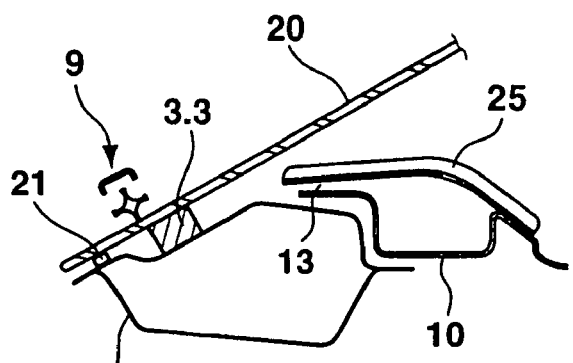
FIG. 2 is a cross-sectional view through a windscreen, an instrument panel, a base component and a second sealing element.

FIG. 2 is a cross-sectional view in the region of the sealing-element section 3.3 and the interruption 7. The windscreen 20 is adhesively bonded onto the base component 17 by a fastening arrangement 21 arranged, e.g., as an adhesive. The sealing-element section 3.3 is arranged between the windscreen 20 and the base component 17, with the sealing-element section 3.3 being fastened to the base component 17, e.g., by adhesive bonding. The sealing-element section 3.3 is pressed between the windscreen 20 and the base component 17.

In the cross-sectional view, an instrument panel 25 which is arranged above the defrosting channel 10 is illustrated. Air may flow through an air outlet opening 13, which is arranged as a gap between the instrument panel 25 and the defrosting channel 10, in the direction of the windscreen 20. The air impacts firstly against the windscreen 20 and secondly against the sealing-element section 3.3 and is therefore deflected upwardly, so that above the instrument panel 25, having passed the interruption 7, it may emerge into the passenger compartment. Since the air flows toward the windscreen 20, it is heated and a defrosting of the wiper blade of the windscreen wiper 9 may occur.

Figure 3:
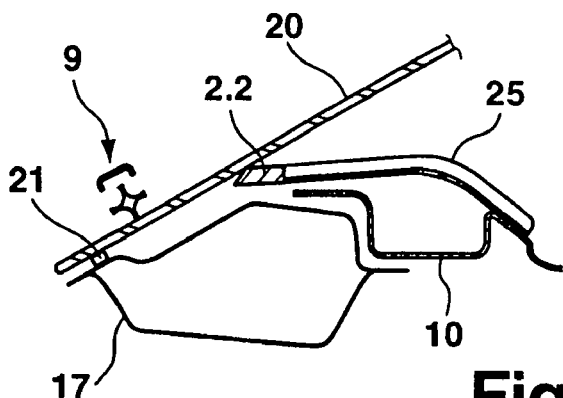
FIG. 3 is a cross-sectional view through a windscreen, an instrument panel, a base component and a first sealing element.

FIG. 3 is a cross-sectional view which leads through the sealing-element section 2.2 and between the sealing-element sections 3.3 and 3.4. It is illustrated that air which is guided out of the defrosting channel 10 in the direction of the windscreen 20 may pass under the windscreen wiper 9, since a second sealing element 3 is not provided at this point. However, the stream of air to which the windscreen 20 is subjected in this region may not escape upwardly, since the sealing-element section 2.2 is arranged between the instrument panel 25 and windscreen 20 and seals off the instrument panel 25 from the windscreen 20. The sealing-element section 2.2 is adhesively bonded to the instrument panel 25. This means that the air has to spread out perpendicularly to the plane of the Figure between the windscreen 20 and the base component 17 in order to be able to leave this region again.

From the foregoing description of FIGS. 2, 3, it should be apparent that the air is deflected in the region between the base component 17 and the windscreen 20. Sound waves are also deflected by the arrangement of the sealing elements 2, 3. Since, in addition, the sealing elements 2, 3 are produced from sound-absorbing foam material, an optimum sound insulation in relation to engine noises may occur. At the same time, a defrosting function may be provided without electric heating devices.

What is claimed is:

1. A seal arrangement, comprising:
   a first seal component adapted to be arranged between an instrument panel of a vehicle and a windscreen of the vehicle; and
   a second seal component arranged below the first seal component and arranged between the windscreen and a base component, the seal arrangement including openings through which air is flowable into a passenger compartment of the vehicle.

2. The seal arrangement according to claim 1, wherein the seal arrangement is adapted for a sound-insulative seal of a gap between the windscreen and the instrument panel.

3. The seal arrangement according to claim 1, wherein the second seal component is interrupted in some sections.

4. The seal arrangement according to claim 1, wherein at least one channel angled at least once is formed by the first seal component and the second seal component.

5. The seal arrangement according to claim 1, wherein at least one of (a) a labyrinthine and (b) a meandering channel is formed by the first seal component and the second seal component.

6. The seal arrangement according to claim 1, wherein each of the first seal component and the second seal component includes a seal-component section that overlap in some sections.

7. The seal arrangement according to claim 6, wherein the overlapping regions have a length of one of (a) greater than 50 mm, (b) greater than 75 mm and (c) approximately 100 mm.

8. The seal arrangement according to claim 1, wherein the second seal component includes an interruption in a region of at least one wiper blade.

9. The seal arrangement according to claim 1, wherein the first seal component and the second seal component provide lateral openings arranged next to at least one of (a) the instrument panel and (b) a defrosting channel.

10. The seal arrangement according to claim 9, wherein a distance between the first seal component and the second seal component at least at one location in a region of the lateral opening is approximately 70 mm.

11. The seal arrangement according to claim 1, wherein the second seal component is substantially L-shaped in side regions.

12. The seal arrangement according to claim 1, wherein the first seal component includes, in a center of the vehicle, an interruption forming an opening of the seal arrangement.

13. The seal arrangement according to claim 12, wherein the interruption has a length of approximately 130 mm.

14. The seal arrangement according to claim 1, wherein at least one of (a) the first seal component and (b) the second seal component is formed from a foam material.

15. The seal arrangement according to claim 14, wherein the foam material includes a polyurethane cut foam.

16. The seal arrangement according to claim 14, wherein the foam material is acrylate-impregnated.

17. The seal arrangement according to claim 14, wherein the foam material is pressed between the windscreen and at least one of (a) the instrument panel and (b) the base component.

18. The seal arrangement according to claim 1, wherein the first seal component is fastened to the instrument panel.

19. The seal arrangement according to claim 1, wherein the first seal component is adhesively bonded to the instrument panel.

20. A vehicle, comprising:
    a seal arrangement including:
        a first seal component arranged between an instrument panel of the vehicle and a windscreen of the vehicle; and
        a second seal component arranged below the first seal component and arranged between the windscreen and a base component, the seal arrangement including openings through which air is flowable into a passenger compartment of the vehicle.

* * * * *